United States Patent

[11] 3,590,693

| | | |
|---|---|---|
| [72] | Inventor | Istvan Rasko<br>Budapest, Hungary |
| [21] | Appl. No. | 839,578 |
| [22] | Filed | July 7, 1969 |
| [45] | Patented | July 6, 1971 |
| [73] | Assignee | Jarmufejlesztesi Intezet<br>Budapest, Hungary |
| [32] | Priority | July 17, 1968 |
| [33] | | Hungary |
| [31] | | JA-541 |

[54] BRAKE CHAMBER DEVICE FOR AIRBRAKE INSTALLATIONS
6 Claims, 3 Drawing Figs.

[52] U.S. Cl. ..................................... 92/64,
92/100
[51] Int. Cl. ............................................ F01b 19/00,
F16j 3/00
[50] Field of Search ............................. 92/99, 98,
98 D, 100, 101, 102, 64

[56] References Cited
UNITED STATES PATENTS

| 356,997 | 2/1887 | Gil | 92/103 |
|---|---|---|---|
| 2,658,526 | 11/1953 | Porter | 92/100 |
| 2,721,579 | 10/1955 | Sexton | 92/100 |
| 2,741,187 | 4/1956 | Moller | 92/99 X |
| 2,751,850 | 6/1956 | Hoover | 92/100 X |
| 2,765,811 | 10/1956 | McClure | 92/100 |
| 2,774,380 | 12/1956 | Hudson et al. | 92/100 |
| 3,151,568 | 10/1964 | Hood et al. | 92/100 X |
| 3,331,291 | 7/1967 | Rumsey | 92/101 X |
| 3,435,733 | 4/1969 | Enke | 92/98 X |

*Primary Examiner*—Martin P. Schwadron
*Assistant Examiner*—Irwin C. Cohen
*Attorney*—Young and Thompson

ABSTRACT: A brake chamber device for airbrake installations, the device having a housing which contains a thrust plate to which is secured a brake actuating rod means and a rolling sealing diaphragm between the thrust plate and the housing which is substantially rigid in the axial direction by means of a solid body being enclosed in the diaphragm, the sealing diaphragm being sealingly attached to both the thrust plate and the housing by means of retaining flanges so that the thrust plate is radially supported.

INVENTOR

ISTVÁN RASKÓ

BY Young & Thompson

ATTORNEYS

BRAKE CHAMBER DEVICE FOR AIRBRAKE INSTALLATIONS

This invention relates to a brake chamber device, which may be used in vehicular airbrakes, the brake chamber device having a housing which contains a thrust plate to which is secured brake actuating rod means.

Airbrakes operate by means of brake cylinders or brake chambers. It is the function of these parts to convert the compression energy of compressed air which arrives through an input into mechanical energy. It is desirable that such devices are simple to manufacture, have a high performance and are safe in operation.

Brake cylinders can have a long bore which contributes to improved performance. Their drawback is that they operate by means of pistons and therefore require extremely accurate machining which includes very precise fit, conicity and ovality etc. of the cylinders. Use of a piston provided with a movable rubber seal also requires very fine machining of the operative surfaces of the cylinder. It is also necessary thoroughly to protect the surfaces from dirt and other unclean matter in order to prevent rapid wear and to ensure safe operation. The desired precision of manufacture and the special requirements reduces profitability.

It is necessary that friction surfaces be lubricated so as to ensure satisfactory functioning. This, however, can only be done in the initial stage of operation, as during operation the rubber sleeve presses with great force—because of the pressure in the cylinder—against the cylinder wall, pushing the lubricant off the cylinder wall. As a result lubrication is greatly reduced and finally ceases altogether. Cessation of lubrication of the friction surfaces not only causes high friction losses but also problems of corrosion. The sliding conditions of the surfaces attacked by corrosion deteriorate further. This circumstance is of especially great importance in airbrakes. Because of the unfavorable friction conditions the operation of the equipment can become unsafe. Reliability, which is so important from the point of view of safety of life and property, is reduced.

Brake chambers can be free of the defects enumerated above, but—similar to brake cylinders—they can satisfy only one of the requirements, i.e. they are simple to manufacture.

The brake chamber operates with a rubber membrane reinforced by a cord fabric pressed to "cap profile". Because of the inserted membrane the chamber's bore and therefore the stroke of the piston is considerably shorter and its performance is correspondingly limited. Because of the complex high demands occurring during operation the membrane shaped by pressing is not as durable as the sliding seal of the cylinder but it nevertheless ensures complete sealing. An advantage of the brake chamber lies therein that its components, because of the use of the rubber membrane, can be made by a single pressing process. There are no surfaces to be machined with great precision and close tolerance and no special instructions for manufacture.

An extremely disadvantageous property of known brake chambers is that the extent of the free force which operates on a thrust rod varies greatly despite the fixed constant pressure. The abruptly dropping initial graph line is relieved by a renewed significant rise which is again followed by a substantial falling off at the end of the piston stroke.

It is desirable to produce a brake chamber device requiring no special machining and no fit of great precision, a device in which, even without special machining, the surface roughness of parts made by deep-drawing or by pressing—housing halves, pressure disc etc.—meets the demands made by considerations of operational safety, and in which device the problems of corrosion are absent. Moreover the device should conform entirely to the increased demands for safety made on brake cylinders.

According to this invention there is provided a brake chamber device for airbrake installations, the device having a housing which contains a thrust plate to which is secured ta brake actuating rod means and a sealing casing between the thrust plate and the housing which is substantially rigid in the axial direction by means of a solid body being enclosed in the casing, the sealing casing being sealingly attached to both the thrust plate and the housing by means of retaining flanges so that the thrust plate is radially supported.

Preferably the sealing casing is of flexible resilient rubber reinforced by inlaid cords running in the direction of the longitudinal axis of the housing. The sealing casing can be constructed as a mutually opposed roll-membrane provided with retaining flanges and surrounding the glide insert.

The seal surrounded by the casing and having a solid insert permits development of the most favorable cylinder diameter and stroke relationship. As a result, the use of adjustment or other auxiliary devices can become unnecessary.

Continuous lubrication of the glide insert "floating" in lubricant in the closed casing is preferably ensured. Favorable operating conditions considerably reduce the various frictional losses. The uniformly high degree of performance can be safeguarded. The degree of the free force which operates on the thrust rod at a given pressure can be constant at any position whatever of the piston. This is of advantage since braking will then be of greater reliability.

Other advantages become manifest if the sealing casing is made endless, since when such a sealing member is used, assembly of the brake chamber is extremely simple, the seal is readily replaceable, and the seal does not have to be filled with lubricant during assembly.

The material of the glide insert may be metal or plastics material. The lubricant can conform to the demands made on it—frost or heat stability—it can be e.g. glycol, silicone oil, brake oil, molybdenum sulfide etc.

Two brake chambers may be connected in series and between them a pushrod is fitted.

Conveniently the solid body is annular and the resilient flexible casing surrounding that body is made endless. In another embodiment, however, the casing surrounding the solid annular body consists of two roll-membranes sealingly joined at the flanges.

Preferably the solid annular body is of plastics material and the lubricant is oil and/or molybdenum sulfide.

The device of the invention is explained in more detail by reference to the accompanying drawings, of which:

Figure 1:
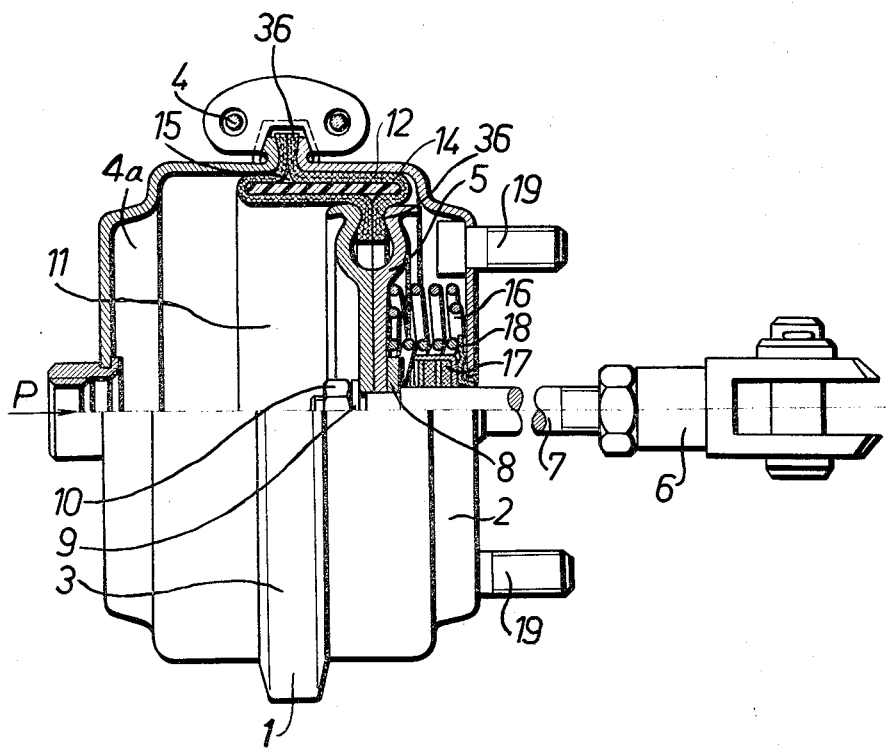
FIG. 1 shows in part section a device according to the invention.

The housing of the working cylinder shown in FIG. 1, which housing is deep-drawn from steel plate, consists of two halves 1 and 2; these are joined by means of a clamping collar 3 and bolts 4.

The pressure of compressed air contained in the brake chamber 4a is transmitted to the brake rod means by pressure plates 5 which also consists of two halves and which are held together, by means of washers 8 and 9 and a bolt 10, on a thrust rod 7 which ends in a fork head 6. Sealing of the halves of the housing 1 and 2 and of the thrust plate 5 is ensured by a casing 11, which is generally cylindrical form and enclosed between the housing halves 1 and 2 and the thrust plates 5. The casing is made of resilient flexible material, and is provided with reinforcing inserts 12 which are arranged in the longitudinal direction of the housing and which prevent or reduce the stretching effect occurring in the longitudinal direction of the applied load. These inserts are suitably cords. An annular glide insert 14 is disposed longitudinally inside the casing 11 which, according to the invention, is preferably constructed as a roll-membrane. This glide insert 14 ensures uniform stress of the cords, their most favorable bending radius as well as taking up of transverse forces. A lubricant 15 enclosed in the roll-membrane creates favorable slip conditions.

The casing 11, which surrounds the glide insert 14, is, by means of retaining flanges 36, sealingly attached to both the pressure plate 5 and the housing halves 1 and 2. The pressure plate 5 is urged to its rest position by a helical spring 16. Ingress of dust or other unclean matter is prevented by a sealing gland 17 retained in its position by a helical spring 18. Bolts 19 serve to mount the cylinder where required.

The brake chamber device operates in the following manner:

The air for operating the brake enters the brake chamber 4a through a control valve and a duct (neither of which is shown in the drawing) in the direction designated in the drawing by arrow P. The thrust plate 5 is displaced by the pneumatic pressure in the direction of the air flow i.e. in the direction of arrow P. The casings 11, which is sealingly fixed to the thrust plate 5 by the flange 36, is displaced together with plate 5, i.e. the casing rolls off the glide insert 14 and the housing in the manner of a roll-membrane. While rolling off, the casing entrains the glide insert 14 in the direction of displacement. The thrust plate 5 moves in the direction of arrow P, but is held by the casing 11 and by the insert 14. For this reason the thrust rod 7 should not be, and must not be, guided anywhere else. From the fact that the thrust rod is guided only longitudinally it follows that the brake chamber of the invention may directly be built in instead of any hither to known brake chamber or any brake cylinder of the prior art.

Figure 2:
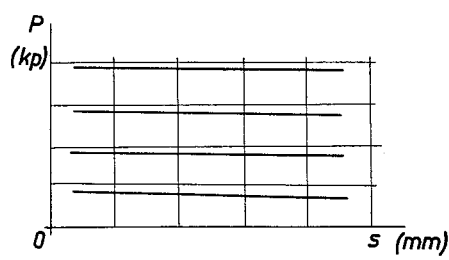
FIG. 2 is a graph showing the characteristics of the device.

In the diagram shown in FIG. 2 the force on the thrust rod is represented in *kp* on the vertical axis and the paths of the piston is represented in mm. on the horizontal axis. The straight lines corresponding to the rising pneumatic pressure are uniformly arranged, almost horizontal and parallel. The slight inclination of the lengthening path S of the piston is due to the return springs situated in the cylinder.

The diagram shows the favorable properties of the cylinder and in particular that the extent of the free force on the thrust rod at a given pressure is constant for any position whatsoever of the piston. In view of operational safety this is of immense importance in braking apparatus.

Figure 3:
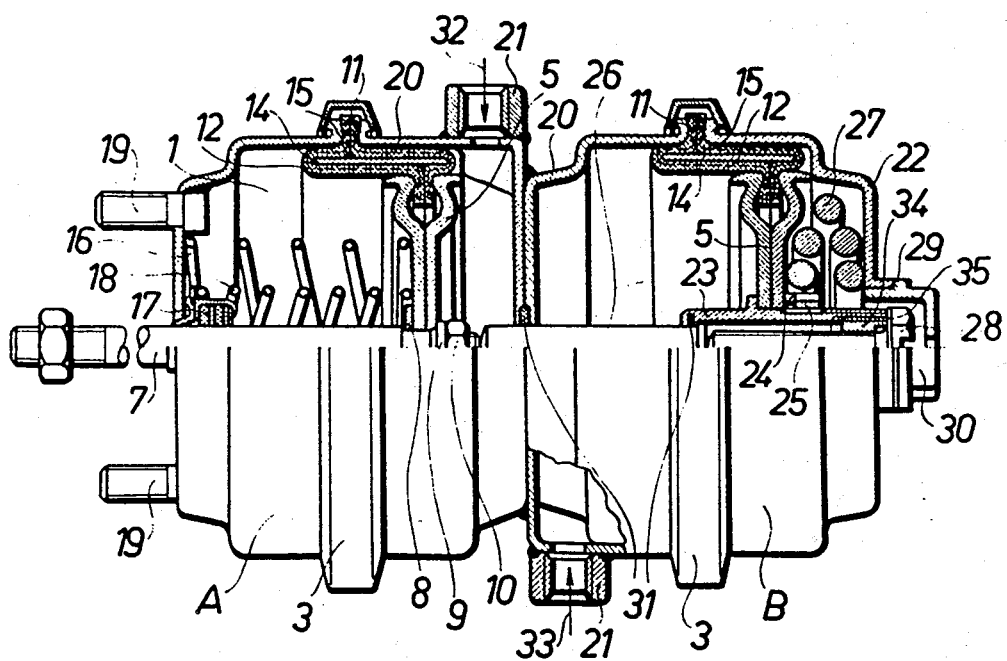
FIG. 3 shows a second embodiment of the device according to the invention utilizing energy stored by spring means.

The brake chamber device of FIG. 3 is essentially a combined construction of two brake chambers of FIG. 1, chamber A being connected to the operative braking apparatus an chamber B to the parking brake and/or emergency braking installation. Housing elements 1, 20 and 22 are held together by clamping collars 3. The housing elements have sockets for connection to the brake-air lines 21.

As in FIG. 1, the pressure plates 5 are held together on the thrust rod 7 by washers 8 and 9 and the nut 10. In both chambers A and B sealing between housing and pressure plates is ensured by the casing 11 made of resilient flexible material and constructed as roll membranes. The cords of the reinforcing insert 12 of the casing 11 serve to prevent or to minimize the stretching effect of the operating force acting in the direction of applied load. Uniform loading, the most advantageous bending radius of the cords and taking up of the transverse forces are ensured by the glide inserts 14 disposed in the casings 11. The lubricant 15 enclosed in the roll-membrane serves to create the best sliding conditions. Return of the thrust plate to its original position is effected by the helical spring 16. A sealing gland 17 reduces ingress of dust and other unclean matter, the gland being retained by helical spring 18. For the purpose of transmitting to thrust rod 7 the brake actuating force acting on thrust plates 5 the brake chamber B contains a threaded bushing 34 inside a hollow bolt 28 a support screw 38 adjoining the bushing, and a push rod.

The pressure plates 5 are secured on the hollow bolt 23 by a washer 24 and a nut 25 and the push rod 26 is sealed inside the hollow bolt 23 and in the bushing 20 by sealing rings 31. The thrust plate 5 is displaced in the braking direction by a compression spring 27. The safeguard the assembly the housing element 22 is closed off by a washer 29 and a locking bolt 30 in which there is a venting aperture.

In the position illustrated in FIG. 3 the brake is not actuated. In brake chamber B the brake operating air 33 acting on the pressure plate 5 holds the compression spring 27 in a compressed state. When the stopping brake is actuated the pressure plate 5 of the brake chamber A is moved in the brake actuating direction by the brake operating air while the pressure plate or brake chamber B remains at rest.

When the brake chamber B is operating as a parking brake or emergency brake the pressure of brake operating air in brake chamber B drops and accordingly the compression spring 27 endeavors to shift the pressure plates 5 of brake chamber B in the braking direction.

The braked condition created by brake chamber B can be removed by unscrewing of the support screw 28 which results in relieving the load on the braking apparatus of the vehicle and rendering the latter movable.

A further arrangement can be made in which the braking power is ensured by brake air introduced from a third brake circuit or container via appropriate connections, instead of by the compression spring 27.

Thus the brake chamber device can operate both as an independent brake chamber and as a mechanism consisting of a plurality of brake chambers connected in series, which ensures operational safety.

What I claim is:

1. A brake chamber device for air brake installations, comprising a housing, a thrust plate in the housing, brake-actuating rod means secured to said thrust plate, a hollow rolling sealing diaphragm of flexible material sealingly attached both to the thrust plate and to the housing and rolling thereon, and a solid body enclosed in said diaphragm and movable relative to the diaphragm and to the housing and to the thrust plate, said body being at all times in slidable engagement with the inner walls of said diaphragm, said body having a length parallel to the path of movement of the thrust plate which is substantially greater than its thickness perpendicular to said path.

2. A device as claimed in claim 1, said body being in the form of a cylindrical annulus.

3. A device as claimed in claim 1, said thrust plate comprising a pair of retaining flanges between which said diaphragm is gripped.

4. A device as claimed in claim 1, including reinforcing cords in said diaphragm extending parallel to the path of movement of the thrust plate.

5. A device as claimed in claim 1, said diaphragm being in two pieces whose edges are secured together between flanges of said housing and of said thrust plate.

6. A device as claimed in claim 1, including an additional brake chamber interconnected in series by a common said rod means.